(12) United States Patent
Wallner et al.

(10) Patent No.: US 9,930,115 B1
(45) Date of Patent: Mar. 27, 2018

(54) VIRTUAL NETWORK STORAGE FUNCTION LAYER COMPRISING ONE OR MORE VIRTUAL NETWORK STORAGE FUNCTION INSTANCES

(71) Applicant: EMC Corporation, Hopkinton, MA (US)

(72) Inventors: Ryan Wallner, South Grafton, MA (US); Robert Anthony Lincourt, Jr., Pawtucket, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 255 days.

(21) Appl. No.: 14/575,080

(22) Filed: Dec. 18, 2014

(51) Int. Cl.
*G06F 15/16* (2006.01)
*H04L 29/08* (2006.01)
*H04L 12/26* (2006.01)
*H04L 12/733* (2013.01)

(52) U.S. Cl.
CPC ...... *H04L 67/1097* (2013.01); *H04L 43/0876* (2013.01); *H04L 45/126* (2013.01); *H04L 67/1095* (2013.01)

(58) Field of Classification Search
CPC ............. H04L 67/1097; H04L 43/0876; H04L 45/126; H04L 67/1095
See application file for complete search history.

(56) References Cited

U.S. PATENT DOCUMENTS

| | | |
|---|---|---|
| 6,459,682 B1 | 10/2002 | Ellesson et al. |
| 6,556,659 B1 | 4/2003 | Bowman-Amuah |
| 7,054,943 B1 | 5/2006 | Goldszmidt et al. |
| 7,269,157 B2 | 9/2007 | Klinker et al. |
| 7,356,602 B2 | 4/2008 | Goldszmidt et al. |
| 7,653,730 B1 | 1/2010 | Hoffman et al. |
| 7,937,453 B1 | 5/2011 | Hayden et al. |
| 8,095,590 B1 * | 1/2012 | Holm .................. H04L 12/1863 709/201 |
| 8,190,850 B1 | 5/2012 | Davenport et al. |

(Continued)

OTHER PUBLICATIONS

European Telecommunications Standards Institute (ETSI), "Network Functions Virtualisation (NFV); Use Cases," ETSI GS NFV 001, V1.1.1, Oct. 2013, 50 pages.

(Continued)

*Primary Examiner* — Ryan Jakovac
(74) *Attorney, Agent, or Firm* — Ryan, Mason & Lewis, LLP (57) ABSTRACT

A first virtual network storage function instance associated with a first portion of at least one network is configured to communicate with at least a second virtual network storage function instance associated with a second portion of the at least one network. The first and second virtual network storage function instances collectively comprise at least part of a virtual network storage function layer configured to interact with an underlying storage layer providing access to physical storage comprising a plurality of storage elements. The first and second virtual network storage function instances are configured to implement at least one data service that involves processing data obtained from at least one of the storage elements via at least one of the first and second portions of the at least one network, responsive to analytics performed by at least one of the first and second virtual network storage function instances.

20 Claims, 5 Drawing Sheets

(56) References Cited

U.S. PATENT DOCUMENTS

| | | |
|---|---|---|
| 8,291,411 B2 | 10/2012 | Beaty et al. |
| 8,452,928 B1 | 5/2013 | Ofer et al. |
| 2002/0083118 A1 | 6/2002 | Sim |
| 2002/0133491 A1 | 9/2002 | Sim et al. |
| 2003/0117954 A1 | 6/2003 | De Neve et al. |
| 2008/0005780 A1* | 1/2008 | Singleton ............. G06F 21/552 726/1 |
| 2011/0023046 A1* | 1/2011 | Gold ..................... G06F 9/5083 718/104 |
| 2012/0076052 A1 | 3/2012 | Kling et al. |
| 2013/0219043 A1* | 8/2013 | Steiner ................. G06F 9/4856 709/224 |
| 2014/0101665 A1 | 4/2014 | Mousseau et al. |
| 2014/0201374 A1 | 7/2014 | Ashwood-Smith et al. |
| 2014/0241247 A1 | 8/2014 | Kempf et al. |
| 2014/0298337 A1 | 10/2014 | Anderson et al. |
| 2014/0301192 A1 | 10/2014 | Lee et al. |
| 2014/0317261 A1 | 10/2014 | Shatzkamer et al. |

OTHER PUBLICATIONS

European Telecommunications Standards Institute, "Network Functions Virtualisation," Introductory White Paper, presented at the SDN and OpenFlow World Congress, http://portal.etsi.org/NFV/NFV_White_Paper.pdf, Oct. 22-24, 2012, pp. 1-16, Issue 1, Darmstadt, Germany.

European Telecommunications Standards Institute, "Network Functions Virtualisation (NFV)," Update White Paper, presented at the SDN and OpenFlow World Congress, http://portal.etsi.org/NFV/NFV_White_Paper2.pdf, Oct. 15-17, 2013, pp. 1-16, Issue 1, Frankfurt, Germany.

A. Keller et al., "The WSLA Framework: Specifying and Monitoring Service Level Agreements for Web Services," Journal of Network and Systems Management, Mar. 2003, pp. 57-81, vol. 11, No. 1.

M. Mangili et al., "Stochastic Planning for Content Delivery: Unveiling the Benefits of Network Functions Virtualization," The 22nd IEEE International Conference on Network Protocols (ICNP), Oct. 2014, 6 pages.

M.K. Nichat et al., "Review on Modeling and Implementation of Cloud Computing," International Journal of Computer Science and Information Technologies (IJCSIT), Jan.-Feb. 2014, pp. 508-511, vol. 5, No. 1.

S. Aleksic et al., "Network Virtualization: Paving the Way to Carrier Clouds (invited)," 16th International Telecommunications Network Strategy and Planning Symposium (Networks), Sep. 2014, pp. 1-6, Funchal, Madeira Island, Portugal.

M. Chiosi et al., "Network Functions Virtualisation—An Introduction, Benefits, Enablers, Challenges & Call for Action," Introductory White Paper, SDN and OpenFlow World Congress, Oct. 2012, pp. 1-16, No. 1, Darmstadt, Germany.

Wikipedia, "Network Functions Virtualization," http://en.wikipedia.org/wiki/Network_Functions_Virtualization, Nov. 2014, 4 pages.

R. Jain, "OpenFlow, Software Defined Networking (SDN) and Network Function Virtualization (NFV)," Washington University in St. Louis, http://www.cse.wustl.edu/~jain/tutorials/icc14.htm, 2014, 93 pages.

\* cited by examiner

VIRTUAL NETWORK STORAGE FUNCTION LAYER COMPRISING ONE OR MORE VIRTUAL NETWORK STORAGE FUNCTION INSTANCES

FIELD

The field relates generally to information processing systems, and more particularly to techniques for implementing storage functionality in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. More recently, network functions virtualization techniques have been proposed for use by telecommunication system and cable system service providers. Conventional aspects of such techniques are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein. However, despite these and other recent advances in virtualization techniques, a need remains for further improvements, for example, with regard to implementation of storage functionality.

SUMMARY

Illustrative embodiments of the present invention provide a virtual network storage function layer comprising one or more virtual network storage function instances that facilitate the implementation of a wide variety of data services in network-based information processing systems.

In one embodiment, an apparatus comprises a first virtual network storage function instance associated with a first portion of at least one network, with the first virtual network storage function instance being configured to communicate with at least a second virtual network storage function instance associated with a second portion of the at least one network. The first and second virtual network storage function instances collectively comprise at least part of a virtual network storage function layer configured to interact with an underlying storage layer providing access to physical storage comprising a plurality of storage elements. The first and second virtual network storage function instances are configured to implement at least one data service that involves processing data obtained from at least one of the storage elements via at least one of the first and second portions of the at least one network, responsive to analytics performed by at least one of the first and second virtual network storage function instances.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
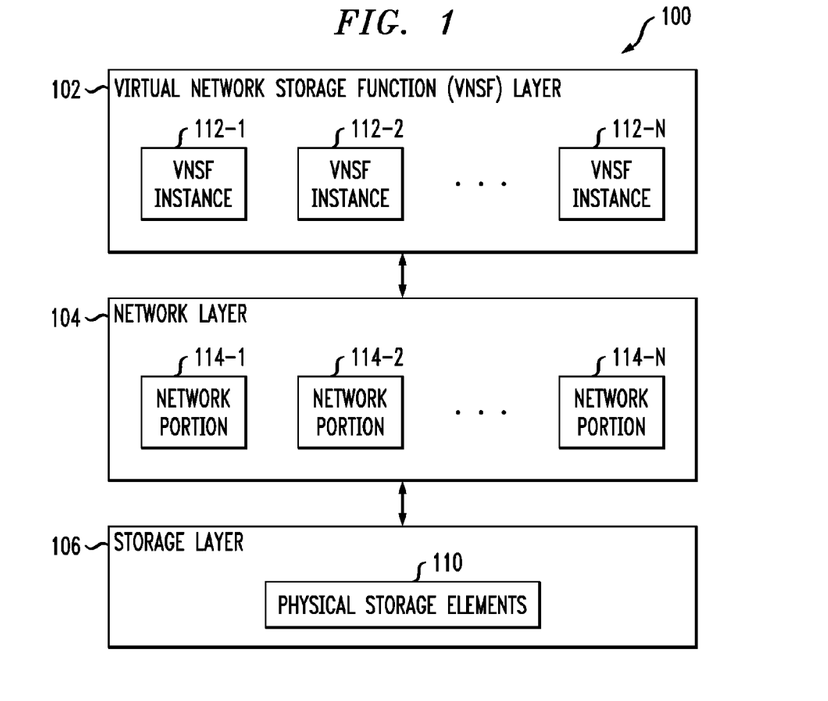
FIG. 1 is a block diagram of an information processing system comprising a virtual network storage function layer with virtual network storage function instances in an illustrative embodiment of the invention.

FIG. 1 shows an information processing system 100 configured in accordance with an illustrative embodiment of the present invention. The information processing system 100 comprises a virtual network storage function (VNSF) layer 102, a network layer 104 and a storage layer 106 illustratively comprising physical storage in the form of a plurality of physical storage elements 110. The VNSF layer 102 comprises a plurality of VNSF instances 112-1, 112-2, . . . 112-N, and the network layer 104 comprises a corresponding plurality of network portions 114-1, 114-2, . . . 114-N.

Although the number of VNSF instances and the number of network portions are the same in this embodiment, this is by way of example only and in other embodiments there may be different numbers of VNSF instances and network portions. For example, multiple VNSF instances 112 may be associated with a single network portion 114, or multiple network portions 114 may be associated with a single VNSF instance 112.

The network portions 114 are associated with one or more networks. For example, each network portion 114 may be associated with a different network, or may represent different portions of the same network.

The VNSF instances 112 are potentially located at different geographic locations within the system 100. For example, in some embodiments, the VNSF instances 112 are geographically separated from at least a portion of the underlying physical storage elements 110 of the storage layer 106. A given VNSF instance 112 allows storage functionality associated with physical storage elements 110 at one geographic location to be implemented at least in part at another geographic location. The VNSF layer 102 in some embodiments can be implemented entirely off-premises relative to the one or more physical locations of the physical storage elements 110 of the storage layer 106.

In such arrangements, the VNSF instance may be viewed as a mechanism for abstracting storage functionality away from the underlying physical storage elements. By way of example, VNSF instances may be used to abstract storage functionality into an NFV framework. This is in contrast to possible alternative arrangements, where storage functionality, even if at least partially virtualized, is nonetheless in large part physically collocated with the corresponding physical storage elements.

The VNSF layer 102 may itself be implemented at least in part within a NFV framework of service provider infrastructure of a telecommunication system or a cable system. The service provider infrastructure may be geographically remote from the physical storage elements of the storage layer 106. Data services provided by the VNSF layer 102 in cooperation with the network layer 104 and storage layer 106 can be provided using virtual compute architectures, such as virtual machines, compute containers and other local compute resources of the service provider infrastructure.

The VNSF layer 102 in some embodiments provides one or more pools of storage capacity and associated storage functionality. It works with the underlying storage layer 106 but abstracts the storage functionality away from the corresponding physical location or locations of the storage elements 110.

The VNSF layer 102 allows dynamic processing of data in ways that would not otherwise be possible utilizing only localized physical storage elements and their associated localized storage functionality. For example, data can be replicated across VNSF instances 112 in various geographic locations to support the Internet of Things (IoT) and various other workloads. A more detailed illustration of dynamic data processing enabled utilizing multiple VNSF instances 112 will be provided below in conjunction with the embodiment of FIG. 4.

The network layer 104 illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The storage layer 106 illustratively comprises one or more storage systems such as VNX® and Symmetrix VMAX®, both commercially available from EMC Corporation of Hopkinton, Mass. Other types of storage elements can be used in implementing storage layer 106 or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of the storage layer 106 and its associated physical storage elements 110.

At least portions of the VNSF layer 102, network layer 104 and storage layer 106 of system 100 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines or other virtualization infrastructure.

Although shown in FIG. 1 as being separate from the network layer 104, the VNSF layer 102 in other embodiments may be implemented at least in part within one or more of the network portions 114. It is also to be appreciated that a given embodiment of the information processing system 100 may include multiple instances of one or more of the VNSF layer 102, network layer 104 and storage layer 106, although only a single instance of each of these layers is shown in the system diagram for clarity and simplicity of illustration.

It should be understood that the particular sets of VNSF instances, network portions and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other systems comprising a VNSF layer with VNSF instances and associated network portions as well as an underlying storage layer. Accordingly, references to components of the FIG. 1 embodiment in the process description below should not be viewed as limiting in any way, as the disclosed process steps can be applied in other information processing systems, including the systems to be described in conjunction with FIGS. 3, 4 and 5.

In step 200, a first VNSF instance associated with a first network portion is provided. For example, one of the VNSF instances 112 of the VNSF layer 102 is configured in association with a corresponding network portion 114 of the network layer 104. The first network portion 114 illustratively comprises hardware and associated software resources that are co-located with the associated VNSF instance 112.

In step 202, the first VNSF instance is adapted for communication with at least a second VNSF instance associated with a second network portion. The first and second VNSF instances 112 collectively comprise at least part of the VNSF layer 102 configured to interact with the underlying storage layer 106 providing access to physical storage comprising multiple distinct storage elements 110. The second network portion 114, like the first network portion 114 previously described, illustratively comprises hardware and associated software resources that are co-located with the associated VNSF instance 112. Accordingly, the first and second VNSF instances 112 in this embodiment are illustratively arranged at different locations within the system 100 and are also geographically remote from at least a portion of the physical storage elements 110 of the underlying storage layer 106.

In step 204, at least one data service is implemented by the first and second VNSF instances 112 that involves processing data obtained from at least one of the physical storage elements 110 via at least one of the first and second network portions 114, responsive to analytics performed by at least one of the first and second VNSF instances. Examples of such analytics will be described below in conjunction with the embodiment of FIG. 4. The analytics performed by at least one of the first and second VNSF instances are assumed to be performed using local compute resources of the respective first and second VNSF instances, such as local portions of respective processing platforms utilized to implement those instances. These local compute resources may comprise, for example, local virtual machines.

A given data service implemented by the first and second VNSF instances may involve, for example, processing the data in accordance with metadata obtained by at least one of the first and second VNSF instances. In the FIG. 4 embodiment, such metadata is obtained from another one of the storage elements via a third portion of the at least one network, and comprises information indicative of a current geographic location of an end user of the data. The metadata utilized in processing the data to provide a corresponding data service in step 204 more generally comprises information indicative of one or more features of the data, and may include, for example, provenance information, tags, etc. Accordingly, the term "metadata" as used herein is intended to be broadly construed.

As another example, a given data service implemented by the first and second VNSF instances 112 may comprise providing at least a portion of the data from the first VNSF instance to the second VNSF instance via the respective first and second portions of the at least one network. In some arrangements of this type, the data or a portion thereof is provided from the first VNSF instance to the second VNSF instance using a specialized container of the network layer 104. Additionally or alternatively, at least a portion of the data may be provided from the first VNSF instance to the second VNSF instance responsive to one or more decisions of a location-based routing protocol. For example, such a routing protocol can be utilized in conjunction with multiple VNSF instances to relocate or replicate data within the system 100 in order to facilitate its access by likely end users of that data.

The term "end user" in this context and elsewhere herein is intended to be broadly construed so as to encompass, for example, human, hardware, software or firmware entities, as well as various combinations of such entities.

Figure 2:
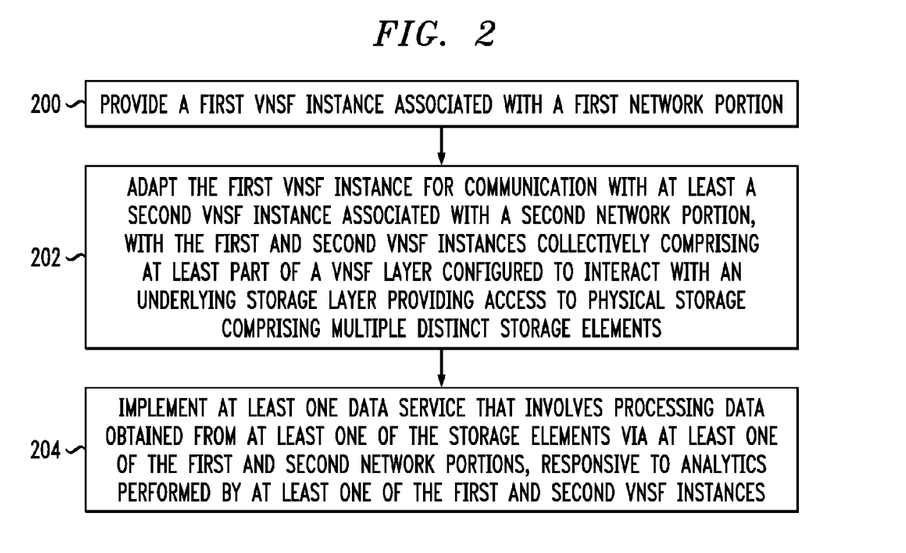
FIG. 2 is a flow diagram of an exemplary process involving the virtual network storage function instances in the information processing system of FIG. 1.

Additional examples of data services implemented by the first and second VNSF instances in the FIG. 2 process illustratively comprise performing at least one of replication, backup, caching, compression, encryption, deduplication and application program interfacing on at least a portion of the data. Other data services may involve deep packet inspection, file access or other types of data access. These and numerous other types of data services can be provided by one or more VNSF instances 112 of the VNSF layer 102 via the underlying network layer 104 and storage layer 106.

It is to be appreciated that the particular data services mentioned above are examples only, and should not be construed as limiting in any way. Numerous other types of data services that can be implemented using one or more VNSF instances of a VNSF layer as disclosed herein will be apparent to those skilled in the art.

The VNSF instances 112 of the VNSF layer 102 are configured to take advantage of respective sets of local resources that are currently available to those VNSF instances in the system, including compute resources and storage resources. By utilizing these local resources to perform storage functions and associated localized analytics, the corresponding VNSF instances 112 of the VNSF layer 102 collectively provides a better end user experience. For example, with the storage functions moved closer to a given end user application through appropriate configuration of the VNSF instances 112 of the VNSF layer 102, improved data protections can be provided based on the particular data flow of the application. As a more specific example, the data can be encrypted earlier in the data flow than would otherwise be possible, which significantly increases the overall protection of the data. Not only can the data be encrypted, but also the application can choose the appropriate time to route the data through any other available data service providing other types of storage functionality. The VNSF layer 102 enables this type of flexibility at scale because its VNSF instances 112 can utilize corresponding local resources throughout the system.

Although the FIG. 2 process is described with reference to first and second VNSF instances implementing at least one data service, this is by way of illustrative example only. In other embodiments, a single VNSF instance can be used. For example, in an embodiment of this type, at least one VNSF instance is associated with one or more portions of at least one network, and comprises at least part of a VNSF layer configured to interact with an underlying storage layer providing access to physical storage comprising multiple storage elements, possibly of a variety of distinct types. The VNSF instance is configured to implement at least one data service that involves processing data obtained from at least one of the storage elements via at least one of the one or more portions of the at least one network, responsive to analytics performed by the VNSF instance. An example of an embodiment involving a single VNSF instance will be described below in conjunction with FIG. 5. Numerous alternative embodiments comprising one or more VNSF instances are possible.

The particular processing operations and other system functionality described in conjunction with the flow diagram of FIG. 2 are presented by way of illustrative example only, and should not be construed as limiting the scope of the invention in any way. Alternative embodiments can use other types of processing operations involving one or more VNSF instances and associated network portions and underlying physical storage elements. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Other illustrative embodiments will now be described in more detail with reference to FIGS. 3, 4 and 5.

Figure 3:
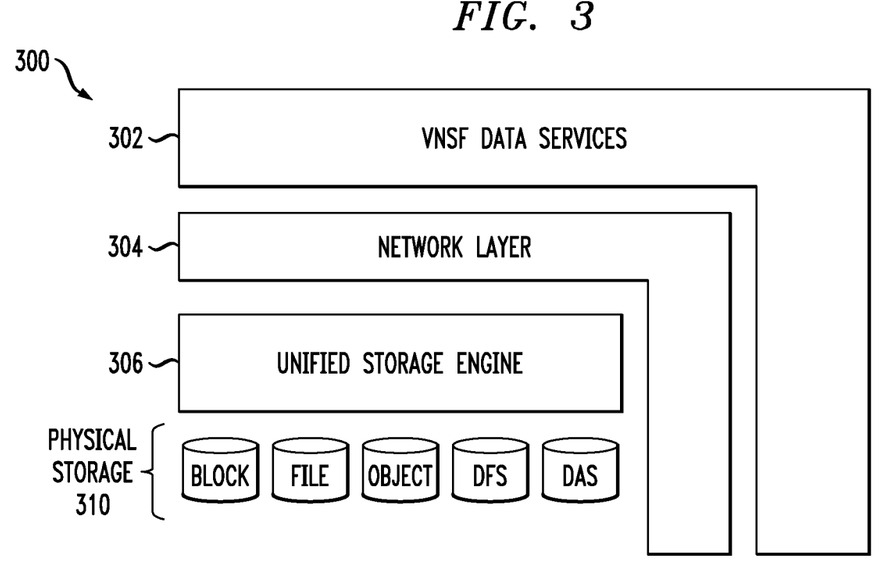
FIG. 3 shows another embodiment of an information processing system comprising a virtual network storage function layer.

FIG. 3 shows another information processing system 300. The information processing system 300, like the system 100 previously described, includes a multi-layered architecture comprising a VNSF data services layer 302, a network layer 304 and storage layer that comprises a unified storage engine 306 adapted to access physical storage elements 310 of several different types.

The physical storage elements 310 in this embodiment illustratively comprise a block storage element, a file storage element, an object storage element, a distributed file system (DFS) and a direct-attached storage (DAS) element. Each of these physical elements may comprise a storage array or a portion thereof or another type of storage device. The particular element types shown in this embodiment are examples only, and various other types of physical storage elements in any combination can be used in other embodiments.

The VNSF data services layer 302 illustratively comprises one or more VNSF instances that communicate over network layer 304 with the underlying unified storage engine 306 which can access all of the different physical storage elements 310.

In this embodiment, the VNSF data services layer 302 and network layer 304 are shaped in the figure to emphasize that each of these layers can effectively access the physical storage elements 310 at the bottom of the layered architecture, albeit through one or more underlying layers of the architecture.

The implementation of one or more VNSF instances in the VNSF data services layer 302 provides more intelligent storage functionality by processing the data in ways that benefit applications and their end users. For example, VNSF instances can move data analytically and efficiently within the system using lightweight containers implemented over the network layer 304, thereby providing both applications and end user workloads with enhanced access to data, potentially at higher rates than would otherwise be possible. Accordingly, the VNSF instances of the VNSF data services layer 302 can be used to provide JED ("Just Enough Data") capabilities, where metadata important to workloads is migrated along the VNSF space to exist closer to an application.

Figure 4:
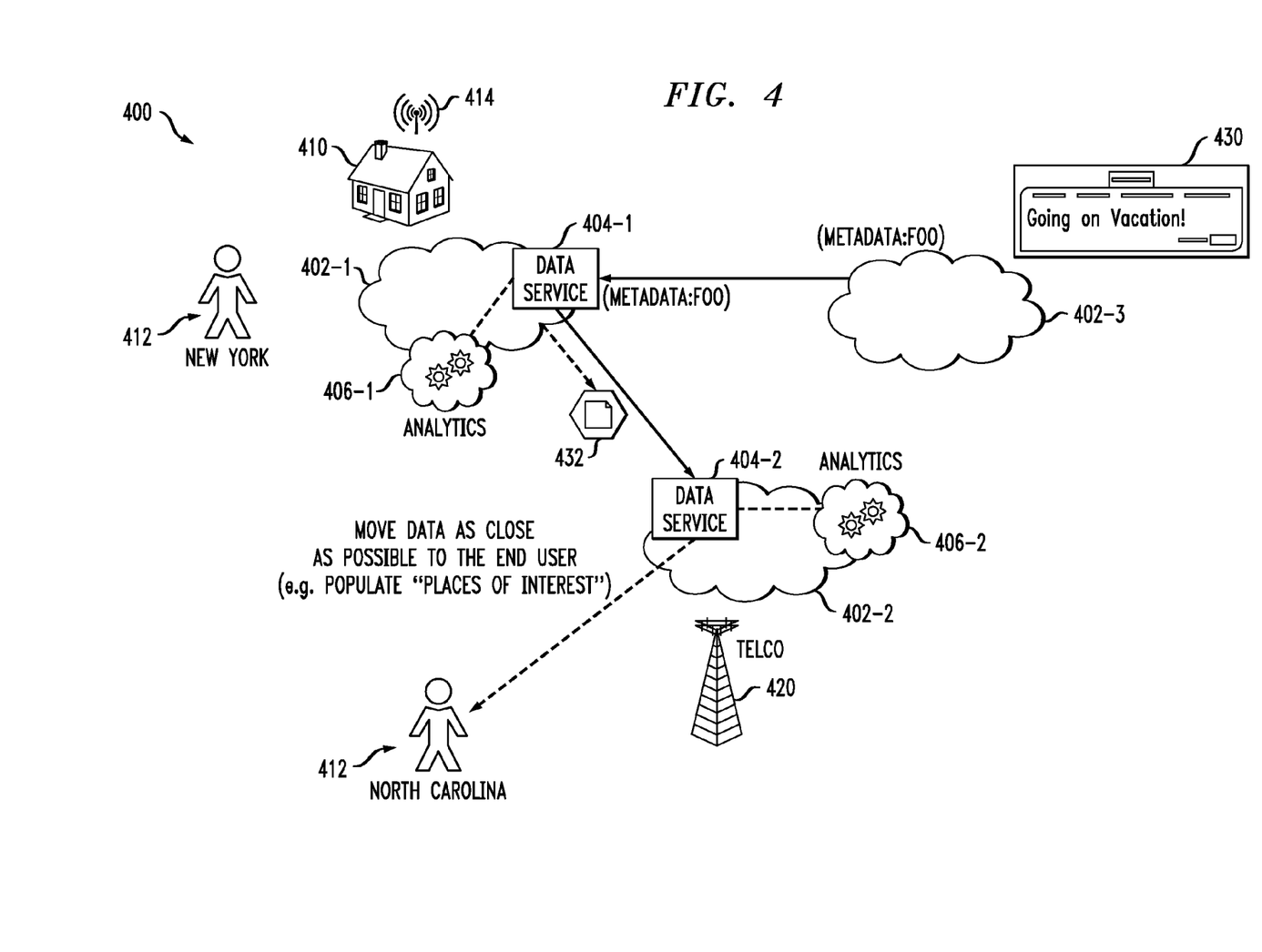
FIG. 4 illustrates an example use case for virtual network storage function instances of a virtual network storage function layer in another embodiment of an information processing system.

Referring now to FIG. 4, an information processing system 400 comprises three distinct network portions 402-1, 402-2 and 402-3, each assumed to be associated with a different geographic location. Each of the first and second network portions 402-1 and 402-2 has an associated VNSF instance that includes a data service component 404-1 or 404-2 and an analytics component 406-1 or 406-2. These first and second VNSF instances and their data service and analytics components 404 and 406 are assumed to be part of a VNSF layer such as the VNSF layer 102 of FIG. 2 or the VNSF data services layer 302 of FIG. 3.

In the FIG. 4 embodiment, the first network portion 402-1 is a network portion in proximity to a home location 410 of an end user 412 in New York. The home location 410 is equipped with a wireless network 414 through which the end user 412 accesses the network portion 402-1 when in New York. At this location, the end user 412 can access, for example, a social media web site served from the third network portion 402-3.

It is assumed in this arrangement that the end user 412 takes a vacation to North Carolina. At this vacation location, the end user 412 accesses the second network portion 402-2 via a base station 420 of a telecommunication service provider. Prior to or in conjunction with his or her travel from New York to North Carolina, the end user 412 posts a message 430 on the social media web site associated with third network portion 402-3. The message 430 states that the end user is "going on vacation."

The first and second VNSF instances comprising data service component 404-1 and analytics component 406-1 in first network portion 402-1 and data service component 404-2 and analytics component 406-2 in second network portion 402-2 collectively detect that a mobile device associated with the end user 412 has traveled from New York to North Carolina and that the end user 412 has posted the "going on vacation" message 430 on the social media web site.

The data service components 404-1 and 404-2 cause data 432 associated with the end user to be migrated from local storage resources of one or both of the first network portion 402-1 and the third network portion 402-3 to the second network portion 402-2 so as to be close as possible to the current geographic location of the end user 412 in North Carolina. For example, the data 432 can be cached in local storage resources associated with the base station 420 of the telecommunication system service provider that services the end user 412 in North Carolina. In addition, relevant metadata denoted as "foo" in the figure is similarly migrated from the third network portion 402-3 through the first network portion 402-1 to the second network portion 402-2 using the data service components 404 and associated analytics components 406 as shown, in order to facilitate provision of data services such as populating "places of interest" for the end user based on the metadata. The metadata can be used to present other types of relevant information to the end user 412 in North Carolina, such as restaurants and activities, via the second network portion 402-2 and the base station 420, possibly in combination or association with the migrated data 432.

The VNSF layer in this embodiment provides JED capability for the end user 412 upon his or her travel from New York to North Carolina. The VNSF layer can be implemented, for example, as a network virtualization overlay on top of an IP backbone or other network portions of one or more service providers. The VNSF layer can migrate the data and associated metadata using a routing protocol that determines which VNSF instance of the VNSF layer is closest to a determined current geographic location of the end user. In the FIG. 4 embodiment, this routing protocol receives as an input the latitude and longitude coordinates of the mobile device of the end user, and determines that the VNSF instance comprising data service component 404-2 and analytics component 406-2 is closest to the end user.

Accordingly, the routing protocol in this embodiment determines the particular VNSF instance to which the data 432 and possibly at least a portion of the associated metadata should be routed in order to provide optimal service to the end user 412 at his or her new location. End user workloads can access the data from local resources at the new location, eliminating in many cases the need to traverse the network portions back to enterprise datacenters. Such migration of data and associated metadata illustratively utilizes the above-noted lightweight specialized containers implemented over the network layer. This allows data and associated metadata to migrate securely between VNSF instances of the VNSF layer through the underlying network layer with little or no downtime to the end user devices.

Figure 5:
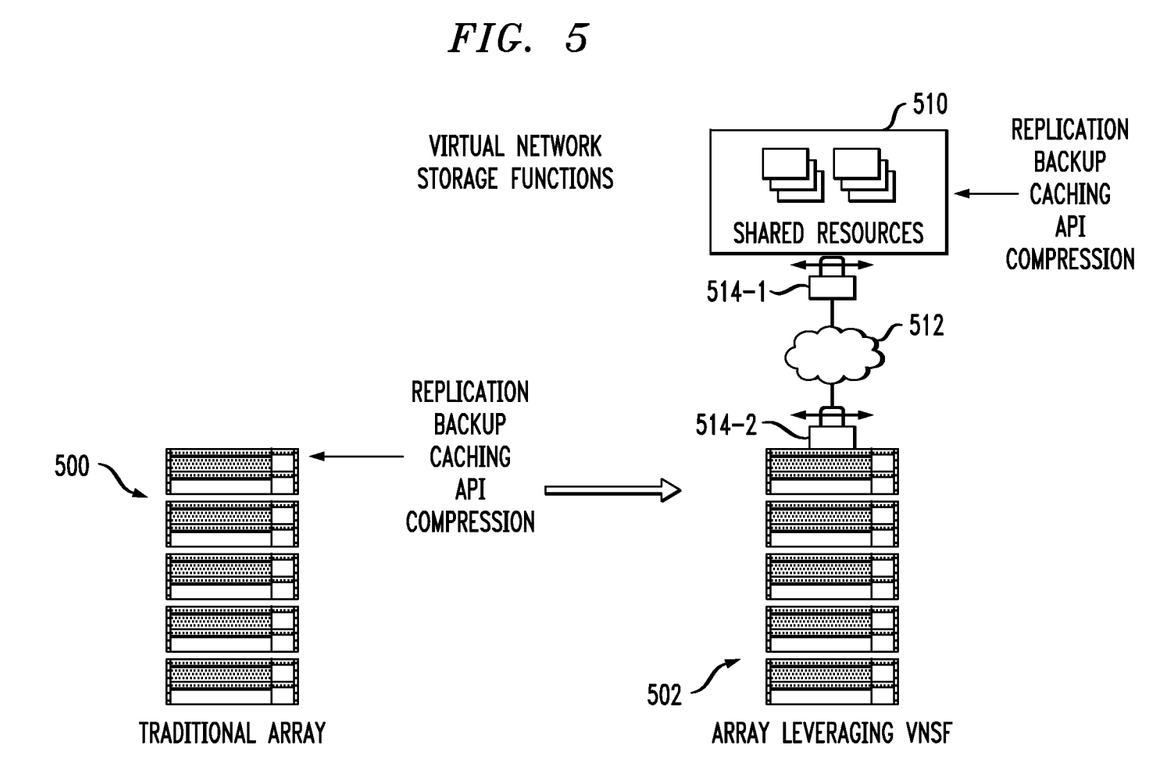
FIG. 5 shows yet another embodiment of an information processing system comprising a virtual network storage function layer.

FIG. 5 shows an embodiment in which an information processing system comprising a storage array 500 with only local storage functionality is reconfigured to utilize one or more VNSF instances of a VNSF layer to provide at least a portion of its storage functionality as disclosed herein. The storage array 500 implements storage functionality that illustratively includes replication, backup, caching, application program interfacing and compression, with these storage functions being co-located with the storage array 500.

In the present embodiment, the storage array 500 is reconfigured as storage array 502 which leverages a VNSF architecture including one or more VNSF instances 510. The one or more VNSF instances 510 provide the storage functionality comprising replication, backup, caching, application program interfacing and compression that was previously localized to the storage array 500, but now implemented as VNSF-based data services using shared resources accessible over a network 512. The network 512 interfaces to the shared resources of the one or more VNSF instances 510 via a first secure interface 514-1 and interfaces to the underlying storage array 502 via a second secure interface 514-2.

The storage functionality in the FIG. 5 embodiment when implemented using the one or more VNSF instances is enhanced in that it can take advantage of VNSF analytics such as geographic migration based on end user location. In addition, computational complexity at the storage array is reduced, thereby conserving local storage array resources such as processor cycles and memory.

It should be understood that the particular system configurations as illustrated in FIGS. 3, 4 and 5 are presented by way of illustrative example only, and should not be construed as limiting in any way. The embodiments of FIGS. 3, 4 and 5 may be viewed as exemplary arrangements in which one or more VNSF instances of a VNSF layer are utilized to implement data services involving processing of data from underlying physical storage elements.

Advantageously, the VNSF layers and associated VNSF instances as disclosed in conjunction with the illustrative embodiments herein considerably facilitate the provision of data services in a wide variety of different contexts by separating storage functionality from underlying physical storage elements. For example, numerous different types of data services can be implemented through chaining of multiple VNSF instances, providing enhanced flexibility and performance. In addition, the illustrative embodiments can be configured to utilize standard networking protocols such as Internet Protocol (IP) and therefore do not exhibit a steep adoption curve and its associated risks. Moreover, isolation provided by a layered VNSF architecture can provide improved security, permitting implementation of highly-targeted data services for sensitive data flows in a given system.

It is to be appreciated that the particular VNSF arrangements and associated storage functionality illustrated in FIGS. 1-5 are exemplary only, and numerous other arrangements may be used in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of the information processing systems of FIGS. 3, 4 and 5, as well as other information processing systems in other embodiments of the invention.

Figure 6:
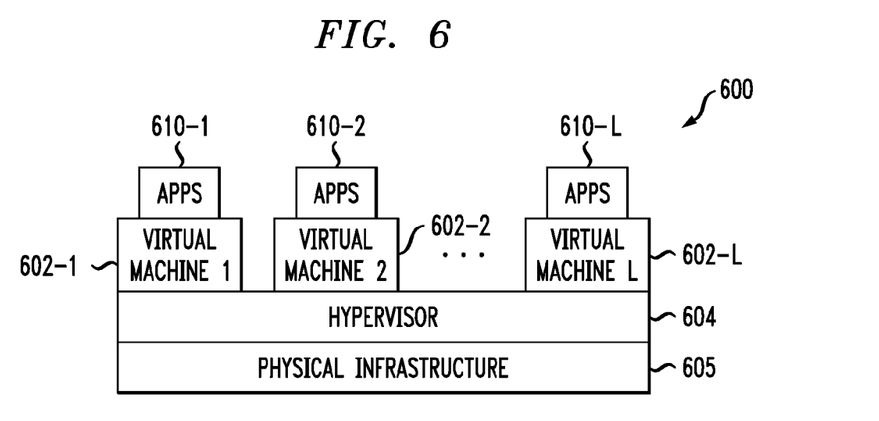
FIGS. 6 and 7 show examples of processing platforms that may be utilized to implement at least a portion of each of the systems of FIGS. 1 and 3-5.
Figure 7:
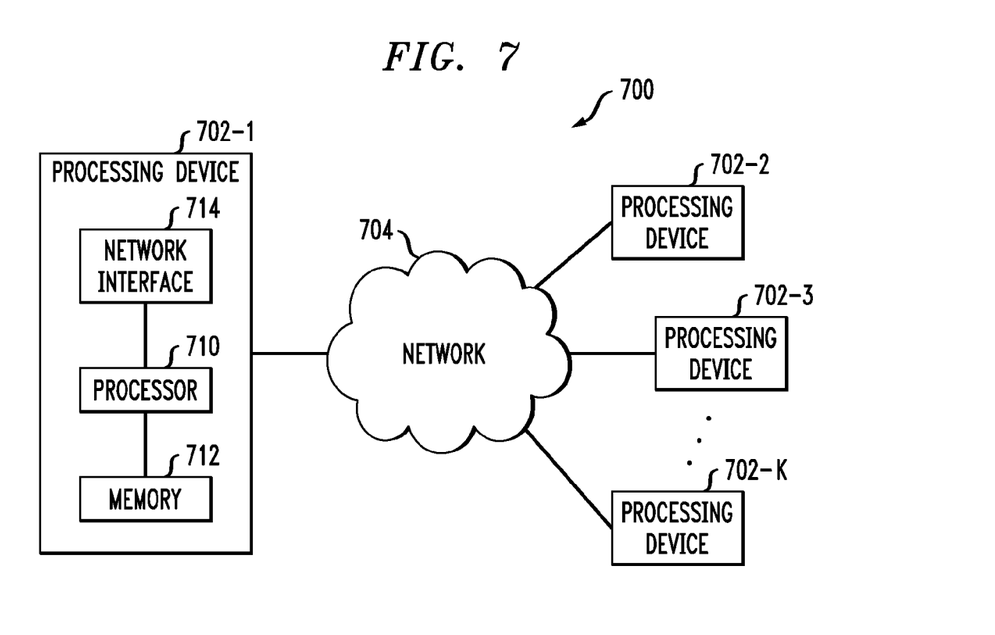

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring VNSF instances or other components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the VNSF instances or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of the system 100 as disclosed herein can be implemented at least in part in the form of one or more software programs stored in memory and executed by a processor of a processing device such as one of the virtual machines 602 or one of the processing devices 702. For example, one or more of the VNSF instances 112 of the VNSF layer 102 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and processing devices that can benefit from the use of VNSF instances of a VNSF layer. Also, the particular configurations of system and device elements shown in FIGS. 1 and 3-7 can be varied in other embodiments. Thus, for example, the particular type of VNSF instances, VNSF layers, network layers and storage layers deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to implement a first virtual network storage function instance associated with a first portion of at least one network;
    the first virtual network storage function instance being configured to communicate with at least a second virtual network storage function instance associated with a second portion of the at least one network;
    wherein the first and second virtual network storage function instances collectively comprise at least part of a virtual network storage function layer configured to interact with an underlying storage layer providing access to physical storage comprising a plurality of storage elements;
    wherein the virtual network storage function layer is implemented within a network functions virtualization framework of a service provider infrastructure of at least one of a telecommunication system and a cable system comprising the at least one processing device, the service provider infrastructure implementing the virtual network storage function layer being geographically remote from the physical storage of the storage layer;
    wherein the first and second virtual network storage function instances are configured to implement at least one data service that involves processing data obtained from at least one of the storage elements via at least one of the first and second portions of the at least one network, responsive to analytics performed by at least one of the first and second virtual network storage function instances;
    wherein the analytics performed by the first virtual network storage function instance are performed at least in part using local compute resources of the service provider infrastructure;
    wherein the at least one data service implemented by the first and second virtual network storage function instances comprises a location-based routing protocol configured to determine a current geographic location of an end user;
    wherein the at least one data service is configured to provide at least a portion of the data from the first virtual network storage function instance to the second virtual network storage function instance responsive to determining that the current geographic location of the end user is geographically closer to the second network portion than the first network portion;
    wherein said at least a portion of the data is provided from the first virtual network storage function instance to the second virtual network storage function instance using a specialized container of a network layer arranged between the virtual network storage function layer and the storage layer, the specialized container providing a data and metadata migration capability based on a current activity of the end user; and
    wherein the data and metadata migration capability comprises providing metadata associated with the current activity of the end user from the first virtual network storage function instance to the second virtual network storage function instance, the second virtual network storage function instance being configured to utilize the metadata to access data from local resources of the second network portion for presentation to the end user, the local resources of the second network portion comprising local storage resources of a wireless base station in the second network portion.

2. The apparatus of claim 1 wherein the at least one data service implemented by the first and second virtual network storage function instances involves processing the data in accordance with metadata obtained by at least one of the first and second virtual network storage function instances.

3. The apparatus of claim 2 wherein the metadata is obtained from another one of the storage elements via a third portion of the at least one network.

4. The apparatus of claim 2 wherein the metadata comprises at least one of (i) the current geographic location of the end user of the data, and (ii) one or more features of the data.

5. The apparatus of claim 1 wherein the storage layer providing access to the physical storage comprises a unified storage engine adapted to access storage elements of a plurality of different types.

6. The apparatus of claim 5 wherein the storage elements of different types comprise at least a subset of a block storage element, a file storage element, an object storage element, a distributed file system and a direct-attached storage element.

7. The apparatus of claim 1 wherein the virtual network storage function layer is separated from the storage layer by a network layer comprising the first and second portions of the at least one network.

8. The apparatus of claim 1 wherein the at least one data service implemented by the first and second virtual network storage function instances comprises performing at least one of replication, backup, caching, compression, encryption, deduplication and application program interfacing on at least a portion of the data.

9. The apparatus of claim 1 wherein the analytics performed by at least one of the first and second virtual network storage function instances are performed using local compute resources of the respective first and second virtual network storage function instances.

10. The apparatus of claim 9 wherein the local compute resources comprise local virtual machines.

11. A processing platform comprising the apparatus of claim 1.

12. An apparatus comprising:
at least one processing device comprising a processor coupled to a memory;
the at least one processing device being configured to implement at least a first virtual network storage function instance associated with one or more portions of at least one network including at least a first portion of the at least one network;
the first virtual network storage function instance comprising at least part of a virtual network storage function layer configured to interact with an underlying storage layer providing access to physical storage comprising a plurality of storage elements;
wherein the virtual network storage function layer is implemented within a network functions virtualization framework of a service provider infrastructure of at least one of a telecommunication system and a cable system comprising the at least one processing device, the service provider infrastructure implementing the virtual network storage function layer being geographically remote from the physical storage of the storage layer;
wherein the first virtual network storage function instance is configured to implement at least one data service that involves processing data obtained from at least one of the storage elements via at least one of the one or more portions of the at least one network, responsive to analytics performed by the first virtual network storage function instance;
wherein the analytics performed by the first virtual network storage function instance are performed at least in part using local compute resources of the service provider infrastructure;
wherein the at least one data service implemented by the first virtual network storage function instance comprises a location-based routing protocol configured to determine a current geographic location of an end user;
wherein the at least one data service is configured to provide at least a portion of the data from the first virtual network storage function instance to at least a second virtual network storage function instance responsive to determining that the current geographic location of the end user is geographically closer to a second portion of the at least one network associated with the second virtual network storage function instance than the first portion of the at least one network associated with the first virtual network storage function instance;
wherein said at least a portion of the data is provided from the first virtual network storage function instance to the second virtual network storage function instance using a specialized container of a network layer arranged between the virtual network storage function layer and the storage layer, the specialized container providing a data and metadata migration capability based on a current activity of the end user; and
wherein the data and metadata migration capability comprises providing metadata associated with the current activity of the end user from the first virtual network storage function instance to the second virtual network storage function instance, the second virtual network storage function instance being configured to utilize the metadata to access data from local resources of the second network portion for presentation to the end user, the local resources of the second network portion comprising local storage resources of a wireless base station in the second network portion.

13. A method comprising:
providing a first virtual network storage function instance associated with a first portion of at least one network; and
adapting the first virtual network storage function instance for communication with at least a second virtual network storage function instance associated with a second portion of the at least one network;
wherein the first and second virtual network storage function instances collectively comprise at least part of a virtual network storage function layer configured to interact with an underlying storage layer providing access to physical storage comprising a plurality of storage elements;
wherein the virtual network storage function layer is implemented within a network functions virtualization framework of a service provider infrastructure of at least one of a telecommunication system and a cable system comprising at least one processing device, the service provider infrastructure implementing the virtual network storage function layer being geographically remote from the physical storage of the storage layer;
wherein the first and second virtual network storage function instances are configured to implement at least one data service that involves processing data obtained from at least one of the storage elements via at least one of the first and second portions of the at least one network, responsive to analytics performed by at least one of the first and second virtual network storage function instances;
wherein the providing and adapting are implemented using the at least one processing device;
wherein the analytics performed by the first virtual network storage function instance are performed at least in part using local compute resources service provider infrastructure;
wherein the at least one data service implemented by the first and second virtual network storage function instances comprises a location-based routing protocol configured to determine a current geographic location of an end user;
wherein the at least one data service is configured to provide at least a portion of the data from the first virtual network storage function instance to the second virtual network storage function instance responsive to determining that the current geographic location of the end user is geographically closer to the second network portion than the first network portion;
wherein said at least a portion of the data is provided from the first virtual network storage function instance to the second virtual network storage function instance using a specialized container of a network layer arranged between the virtual network storage function layer and the storage layer, the specialized container providing a data and metadata migration capability based on a current activity of the end user; and wherein the data and metadata migration capability comprises providing metadata associated with the current activity of the end user from the first virtual network storage function instance to the second virtual network storage function instance, the second virtual network storage function instance being configured to utilize the metadata to access data from local resources of the second network portion for presentation to the end user, the local resources of the second network portion comprising local storage resources of a wireless base station in the second network portion.

14. The method of claim 13 wherein the at least one data service implemented by the first and second virtual network storage function instances comprises performing at least one of replication, backup, caching, compression, encryption, deduplication and application program interfacing on at least a portion of the data.

15. A non-transitory processor-readable storage medium having stored therein program code of one or more software programs, wherein the program code when executed by said at least one processing device causes the method of claim 13 to be performed.

16. An information processing system comprising:

a first processing device comprising a first processor coupled to a first memory;

at least a second processing device comprising a second processor coupled to a second memory;

the first processing device being configured to implement a first virtual network storage function instance associated with a first portion of at least one network;

the second processing device being configured to implement a second virtual network storage function instance associated with a second portion of the at least one network;

wherein the first and second virtual network storage function instances collectively comprise at least part of a virtual network storage function layer configured to interact with an underlying storage layer providing access to physical storage comprising a plurality of storage elements;

wherein the virtual network storage function layer is implemented within a network functions virtualization framework of a service provider infrastructure of at least one of a telecommunication system and a cable system comprising the first and second processing devices, the service provider infrastructure implementing the virtual network storage function layer being geographically remote from the physical storage of the storage layer;

wherein the first and second virtual network storage function instances are configured to implement at least one data service that involves processing data obtained from at least one of the storage elements via at least one of the first and second portions of the at least one network, responsive to analytics performed by at least one of the first and second virtual network storage function instances;

wherein the analytics performed by at least one of the first and second virtual network storage function instances are performed at least in part using local compute resources of the service provider infrastructure;

wherein the at least one data service implemented by the first and second virtual network storage function instances comprises a location-based routing protocol configured to determine a current geographic location of an end user;

wherein the at least one data service is configured to provide at least a portion of the data from the first virtual network storage function instance to the second virtual network storage function instance responsive to determining that the current geographic location of the end user is geographically closer to the second network portion than the first network portion;

wherein said at least a portion of the data is provided from the first virtual network storage function instance to the second virtual network storage function instance using a specialized container of a network layer arranged between the virtual network storage function layer and the storage layer, the specialized container providing a data and metadata migration capability based on a current activity of the end user; and wherein the data and metadata migration capability comprises providing metadata associated with the current activity of the end user from the first virtual network storage function instance to the second virtual network storage function instance, the second virtual network storage function instance being configured to utilize the metadata to access data from local resources of the second network portion for presentation to the end user, the local resources of the second network portion comprising local storage resources of a wireless base station in the second network portion.

17. The apparatus of claim 12 wherein the storage layer providing access to the physical storage comprises a unified storage engine adapted to access storage elements of a plurality of different types.

18. The apparatus of claim 12 wherein the virtual network storage function layer is separated from the storage layer by a network layer comprising the first portion of the at least one network.

19. The method of claim 13 wherein the virtual network storage function layer is separated from the storage layer by a network layer comprising the first and second portions of the at least one network.

20. The information processing system of claim 16 wherein the virtual network storage function layer is separated from the storage layer by a network layer comprising the first and second portions of the at least one network.

* * * * *